(12) United States Patent
Menzer et al.

(10) Patent No.: US 11,428,599 B2
(45) Date of Patent: Aug. 30, 2022

(54) METHOD AND APPARATUS FOR TESTING TIGHTNESS OF AN ENCLOSURE

(71) Applicant: DISTRAN AG, Zurich (CH)

(72) Inventors: Fritz Menzer, Zurich (CH); Florian Perrodin, Zurich (CH); Joel Busset, Zurich (CH)

(73) Assignee: DISTRAN AG, Zurich (CH)

( * ) Notice: Subject to any disclaimer, the term of this patent is extended or adjusted under 35 U.S.C. 154(b) by 64 days.

(21) Appl. No.: 17/070,329

(22) Filed: Oct. 14, 2020

(65) Prior Publication Data

US 2022/0113215 A1    Apr. 14, 2022

(51) Int. Cl.
*G01M 3/24* (2006.01)
(52) U.S. Cl.
CPC ..................... *G01M 3/24* (2013.01)
(58) Field of Classification Search
CPC ........................................................ G01M 3/24
See application file for complete search history.

(56) References Cited

U.S. PATENT DOCUMENTS

| | | | |
|---|---|---|---|
| 4,901,576 A | 2/1990 | Rademacher | |
| 5,780,723 A | 7/1998 | Koo | |
| 9,097,605 B2 | 8/2015 | Calvanese Strinati | |
| 9,939,343 B2 | 4/2018 | Muehleisen et al. | |
| 9,995,647 B2* | 6/2018 | Huseynov | G01M 3/24 |
| 10,139,268 B2 | 11/2018 | Nunes et al. | |
| 10,349,213 B2 | 7/2019 | Berger et al. | |
| 2005/0132808 A1 | 6/2005 | Brown et al. | |
| 2008/0260167 A1* | 10/2008 | Kim | G01H 3/125 345/440.1 |
| 2011/0018996 A1* | 1/2011 | Mian | G08B 13/196 348/143 |
| 2016/0091387 A1 | 3/2016 | Muehleisen et al. | |
| 2016/0210973 A1 | 7/2016 | Kim et al. | |
| 2018/0217284 A1 | 8/2018 | Zhao et al. | |
| 2019/0222960 A1 | 7/2019 | Hua | |
| 2019/0261108 A1* | 8/2019 | Saksela | G01H 3/125 |

FOREIGN PATENT DOCUMENTS

| | | |
|---|---|---|
| CN | 107328528 A | 11/2017 |
| DE | 10 2009 019 819 A1 | 12/2009 |
| DE | 10 2016 224 375 B4 | 10/2018 |

(Continued)

OTHER PUBLICATIONS

Patel et al., "Detecting Building Leakages Using Nearfield Acoustic Holography and a Simulated Crack in the Building Wall," Presentation Slides, 169th Meeting of the Acoustical Society of America, Pittsburgh, Pennsylvania, May 18-22, 2015, 16 pages.

*Primary Examiner* — Paul M. West
*Assistant Examiner* — Mark A Shabman
(74) *Attorney, Agent, or Firm* — Workman Nydegger (57) ABSTRACT

A method and apparatus for checking an enclosure for leaks. An ultrasonic signal generator on one side of the enclosure emits ultrasonic signals. An array of ultrasonic transducers on the other side of the enclosure received ultrasonic signals from the signal generator through a leak and produces an acoustic image. An optical camera generates an optical image that may be combined with the acoustic image to display the location of a leak in the enclosure. An estimate of the leak size may be calculated and displayed together with the acoustic image.

23 Claims, 9 Drawing Sheets

(56) References Cited

FOREIGN PATENT DOCUMENTS

| | | |
|---|---|---|
| EP | 2 581 723 A2 | 4/2013 |
| FR | 2 981 151 B1 | 10/2013 |
| JP | S60-238733 A | 11/1985 |
| JP | 2013-044612 A | 3/2013 |
| JP | 2016-061763 A | 4/2016 |
| WO | 2018/184089 A1 | 10/2018 |

* cited by examiner

FIG. 19

METHOD AND APPARATUS FOR TESTING TIGHTNESS OF AN ENCLOSURE

FIELD

The present disclosure relates generally to testing the tightness of an enclosure, and more particularly to an improved technique for testing the tightness of an enclosure where a signal generator is arranged inside the enclosure and a signal receiving transducer array is arranged outside of the enclosure.

BACKGROUND

The structural integrity of an enclosure sometimes needs to be checked or tested to ensure the enclosure is air-tight or water-tight. Enclosures such as shipping containers or automobiles may be checked for tightness, for example, to ensure that no rain water or debris will enter the enclosure. Another example is checking the air-tightness of a building to ensure that a fire protection system will work effectively so that the system will be able to deplete oxygen inside the building when activated.

A conventional technique is to place an ultrasound signal generator inside an enclosure and to search for ultrasound emanating from the enclosure using a specialized ultrasound detection device, usually having a single microphone. The operator then scans the entire surface of potential leakage areas to search for ultrasounds emanating from the enclosure. Such a conventional technique is disclosed in U.S. Pat. No. 5,780,723 in the form of a sealing quality tester for testing the seal quality of an automobile, where an ultrasonic generator, which is located inside an automobile, produces ultrasonic waves which can be received by an ultrasonic receiver, which is located outside of the automobile. This conventional technique is time consuming and, in noisy environments, such as factories, ports, ships, logistics centers, etc., a high noise level in the environment may result in the inability to accurately detect leaks.

Furthermore, in accordance with such a conventional technique, when a single microphone is used to detect ultrasound emanating from an enclosure, determining the location of leaks depends significantly on the skill of the operator. When a leak is detected, the operator needs to be skilled in bringing the detection device's microphone near or pointing the detection device at the exact location of the leak. Once the location is determined, it needs to be documented, which is typically done manually, introducing yet another source of inaccuracy and potential errors.

Therefore, there is a need for a method and system to quickly and accurately determine the tightness of an enclosure which is robust also in noisy environments.

SUMMARY

Disclosed is a method and apparatus for checking the tightness of an enclosure, such as a container, a building or a vehicle, that detects leaks efficiently and precisely, even in noisy environments. According to an embodiment, the apparatus and method is less dependent on the skills of the operator than conventional techniques, and, in particular, provides visual information regarding the location of a leak that is independent of the operator. In addition, an embodiment provides an estimate of the size of leaks (e.g. an estimate of the surface area of a leak).

In an embodiment, there is provided a system for testing an enclosure for leaks, comprising at least one acoustic camera placed outside of the enclosure and comprising a plurality of electro-acoustic transducers arranged in a predetermined pattern, each of the transducers converts received acoustic signals into electrical signals, an acoustic transmitter placed inside the enclosure comprising at least one transmitter generating acoustic signals, an electronic data processor programmed to receive and filter the electrical signals from the acoustic camera and process the filtered signals to produce an acoustic image representative of the acoustic signals received by the acoustic camera that were generated by the acoustic transmitter and have traveled through a leak in the enclosure, a display operatively coupled with the electronic data processor for displaying at least the acoustic image of the leak.

In addition, the system may include at least one optical camera that generates an optical image including at least a portion of the enclosure, the optical image is displayed together with the acoustic image on the display. The acoustic camera, and optical camera and the display may be integrated into a portable unit.

The acoustic transmitter may generate acoustic signals in the ultrasonic frequency range or in a range from 20 kHz to 800 kHz.

In an embodiment, the acoustic transmitter may transmit signals according to a protocol comprising at least one of a frequency hopping protocol, a coded pulse signal protocol, a multi-frequency signaling protocol and a pure tone signaling protocol, and a filter, which matches the protocol implemented by the transmitter, may be applied to the signals received from the acoustic camera.

In an embodiment, the acoustic image of the leak is displayed in real-time.

In an embodiment, the filtered signals may be analyzed to determine the size of the leak, and information regarding the size of the leak may be displayed on the display.

In an embodiment, the enclosure may be conveyed past the electro-acoustic transducers which are disposed in a fixed arrangement.

In another embodiment, there is provided an apparatus for determining the location of a leak in an enclosure, comprising a plurality of ultrasonic transducers arranged in a predetermined pattern, each transducer converts received ultrasonic signals into electrical signals, the array of ultrasonic transducers disposed on one side of the enclosure; at least one optical camera disposed on the one side of the enclosure, the optical camera being arranged to generate optical image signals of at least a portion of the enclosure; at least one ultrasonic transmitter that generates ultrasonic signals, the ultrasonic transmitter being disposed on the other side of the enclosure; an electronic data processor arranged to receive the signals from the ultrasonic transducers and the optical camera signals, the electronic data processor being programmed to process the received signals to generate a composite image of the optical image and an image representative of an acoustic image based on ultrasonic signals received by the ultrasonic transducers from the ultrasonic transmitter through a leak in the enclosure; and at least one display that is operatively coupled to the electronic data processor that displays at least the composite image.

In an embodiment, the ultrasonic transducers and the optical camera may be integrated together for combined movement about the enclosure.

The ultrasonic transmitter may be provided as a plurality of ribbon tweeters disposed on the edges of a regular polyhedron.

The apparatus may be utilized to determine if there is a leak in a vehicle, a freight container or a building. In addition, if a leak is found, the apparatus may determine to location of the leak. In addition, the apparatus may determine the size of the leak.

In an embodiment, the apparatus may include a first wireless transceiver operatively coupled with the electronic data processor and a second wireless transceiver operatively coupled with the array of ultrasonic transducers, the first and second wireless transceiver wirelessly may communicate information to match a signal protocol of the ultrasonic transmitter to a signal protocol of the ultrasonic transducers.

In an embodiment, the apparatus may utilize a synchronization protocol to determine time-of-flight or distance parameters to estimate the size of the leak.

In an embodiment, the ultrasonic transmitter may be comprised of a plurality of individual speakers generating independent ultrasonic signals.

In an embodiment, there is provided a method for testing an enclosure for leaks comprising the steps:
transmitting ultrasonic signals from within the enclosure using at least one ultrasonic transmitter disposed within the enclosure,
receiving ultrasonic signals from the ultrasonic transmitter emitted through a leak in the enclosure using an array of ultrasonic transducers disposed outside of the enclosure, the ultrasonic transducers receiving ultrasonic signals and converting the ultrasonic signals to electrical signals,
processing the received ultrasonic signals to generate an ultrasonic image representative of the ultrasonic signals received through a leak in the enclosure, and
displaying the ultrasonic image on a display.

In an embodiment, the array of ultrasonic transducers may be comprised of a plurality of spaced apart ultrasonic transducers disposed at fixed locations outside of the enclosure, and the method may include the step of conveying the enclosure past the plurality of spaced apart ultrasonic transducers.

In an embodiment, the method may include the steps of: receiving ultrasonic signals using the array of ultrasonic transducers from an environment outside of the enclosure where the array of ultrasonic transducers is disposed; applying a coding protocol to the ultrasonic signals transmitted by the ultrasonic transmitter based upon the ultrasonic signals received from the environment; and applying a filtering protocol corresponding to the coding protocol to the signals received from the ultrasonic transducers. For example, signal from the array of ultrasonic transducers may be analyzed to determine the spectrum of the noise in the environment, and a pure tone signaling protocol may be selected, the frequency at which the environment is the most quiet. Alternatively, a multi-frequency signaling protocol may be selected with frequencies chosen such as to minimize both the impact of environment noise and the risk of sound being attenuated due to the shape and material of the enclosure.

Figure 1:
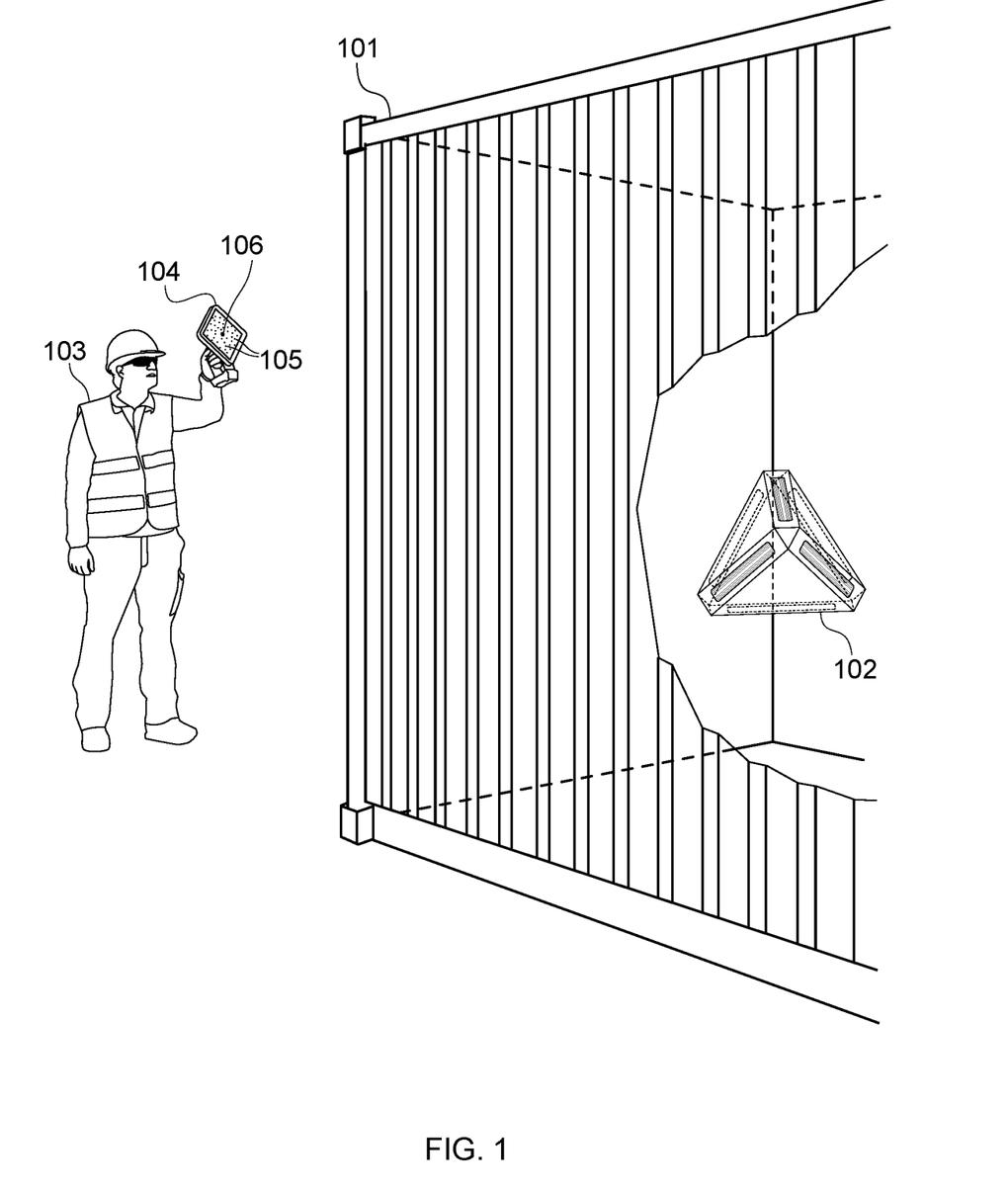
FIG. 1 is a view illustrating an embodiment being used to check for leaks in a shipping container.

An embodiment is illustrated in FIG. 1, which shows an enclosure 101, such as a shipping container, with a signal generator 102 placed inside. An operator 103 holds an acoustic camera 104 equipped with electro-acoustic transducers 105 and an optical camera 106. The signal generator 102 includes one or more sound emitters, such as loudspeakers or ribbon tweeters, and the acoustic camera 104 comprises multiple transducers capable of converting sound pressure and/or particle velocity into electrical signals. The transducers may be arranged in a pattern suitable for source localization and/or acoustic imaging (e.g. by means of delay-and-sum beamforming). Examples of such patterns are a rectangular grid, a random pattern, or a Fibonacci sequence spiral pattern (like the distribution of seeds on a sunflower).

In an alternative embodiment, the signal generator may be placed outside of the enclosure and the receiving transducer array may be placed inside of the enclosure. In this embodiment, the receiving transducer array receives signals through a leak which were generated by the signal generator.

In an embodiment, the signal generator repeatedly emits ultrasonic coded pulse signals. By applying, at the receiver, to each signal received by the transducer array, a filter designed to selectively enhance the emitted coded pulse signals from the signal generator, the sensitivity of the apparatus with respect to leaks can be increased, especially in noisy environments. In one implementation, the filter's impulse response could be defined as the time-reversed coded pulse signal, and in another implementation, an optimized matched filter could be designed. Whenever an emitted coded pulse signal reaches a transducer in the receiver, the filtered transducer's signal will show a local maximum. By applying an acoustic imaging technique on the filtered signals from all transducers in the receiving transducer array, the location of leaks in the enclosure can be readily determined. In this regard, such an arrangement for the transducer array may sometimes be considered to be an acoustic camera. An acoustic camera is a device having at least a receiving transducer array and associated signal processing hardware and software capable of producing acoustic images. In some embodiments, the signal processing hardware and software may be part of the transducer array, and in other embodiments, such processing hardware and software may be provided separately by a system to which is transducer array signals are supplied. In another embodiment, the acoustic camera may be provided with an optical camera that captures optical images that can be used to create a composite image, where an acoustic image and an optical image are combined, and may be displayed together.

An acoustic imaging technique can consist of delay-and-sum beamforming in every direction specified by a matrix of directions arranged in a regular fashion (similar to the look directions of pixels of an optical camera) and may derive an intensity value for each direction. An acoustic image is obtained by creating a matrix of intensity values with the same size as the matrix of directions. Each intensity value is related to the energy of a signal obtained by beamforming (beam formed signal) in the direction specified by the direction in the corresponding element of the matrix of directions. For example, the intensity value can be obtained by computing the root-mean-square value of the beam formed signal. The matrix of intensities can be interpreted as a greyscale image. Alternatively, the matrix of intensities can be interpreted as a color image by applying a color map.

The times at which the local maxima caused by pulse signals emitted by the signal generator occur are detected and the acoustic imaging technique is only applied to a short time frame around the maxima (for example 10 ms around each maximum). Thus, by keeping only signals around maxima, the signal-to-noise ratio can be further improved.

BRIEF DESCRIPTION OF THE DRAWINGS

In disclosure is explained in detail below in connection with various illustrated in the drawings, in which.

DETAILED DESCRIPTION

Embodiments are explained in more detail below with reference to the drawings.

Figure 2:
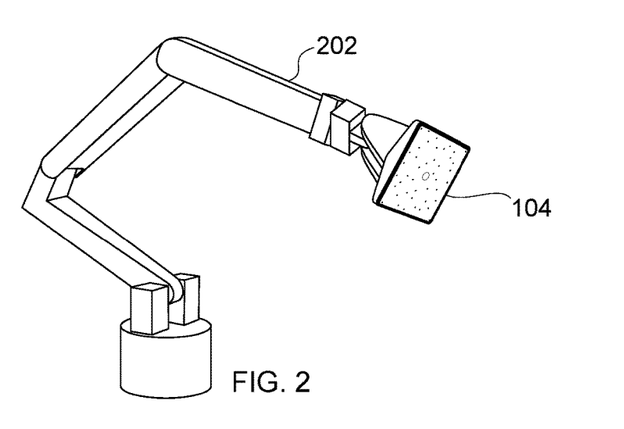
FIG. 2 illustrates an embodiment implemented with a robotic arm.

FIG. 2 illustrates an example embodiment where the acoustic camera 104 is mounted on a robotic arm 202. In this arrangement, the robotic arm may be remotely operated or programmed to operate in a substantially automatic mode to check for tightness. Such an arrangement may be advantageous in an environment that may be hazardous (i.e., risk or radiation, or poor lighting or air quality) or difficult to access for a human operator.

Figure 3:
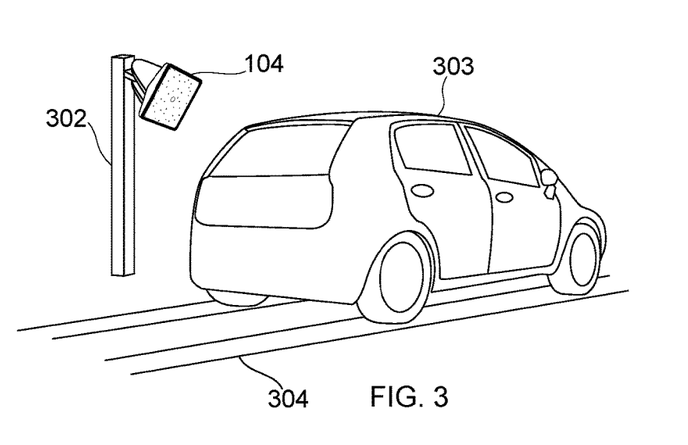
FIG. 3 illustrates an embodiment implemented with a conveyor arrangement.

FIG. 3 illustrates another example embodiment where the acoustic camera 104 is disposed on a fixed pole 302, and the system checks the tightness of a vehicle 303 containing a signal generator that is moving along a conveyor belt 304. This arrangement may be used in a manufacturing or assembly line to automatically check the tightness of a vehicle.

Figure 4:
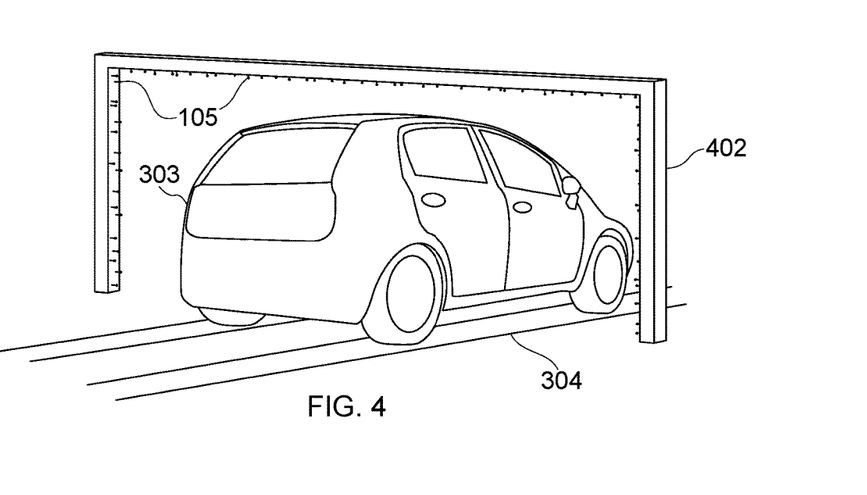
FIG. 4 illustrates another embodiment implemented with a conveyor arrangement.

FIG. 4 illustrates an embodiment for checking the tightness of a vehicle in a manufacturing or assembly line. The acoustic camera consists of a plurality of microphones 105 disposed along a gate-like structure 402 under which a vehicle 303 containing a signal generator is moved by a conveyor belt 304. In this embodiment, which may be substantially or completely automated, the acoustic camera itself may be sufficient and an optical camera may not be necessary because a human operator may not be involved. Alternatively, an optical camera could also be included so to provide visual information regarding a leak that may be stored and subsequently reviewed by a human operator.

Figure 5:
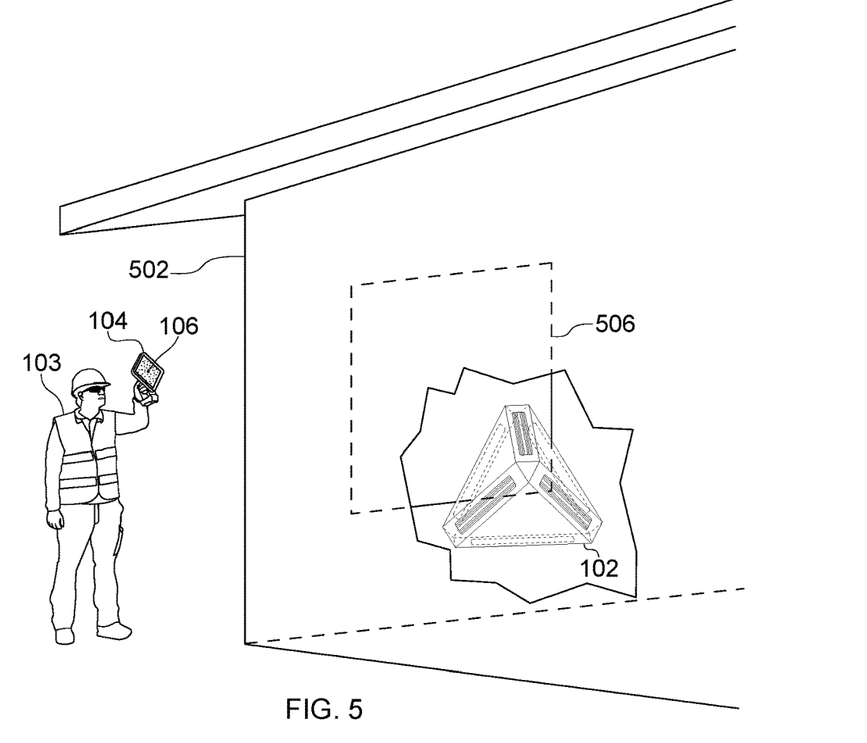
FIG. 5 is a view illustrating an embodiment being used to check for leaks in a building.

FIG. 5 illustrates another embodiment where a signal generator 102 is placed inside a building 502 and an operator 103 holds an acoustic camera 104 including an optical camera 106 to check the tightness of the building structure. Ultrasound signals emitted from the signal generator 102 may be transmitted through a faulty window frame 506 which is received by the acoustic camera 104. This arrangement may be used in connection with an application to check the air tightness of a building, such as in connection with fire a protection system that operates to deplete the oxygen inside the building.

Figure 6:
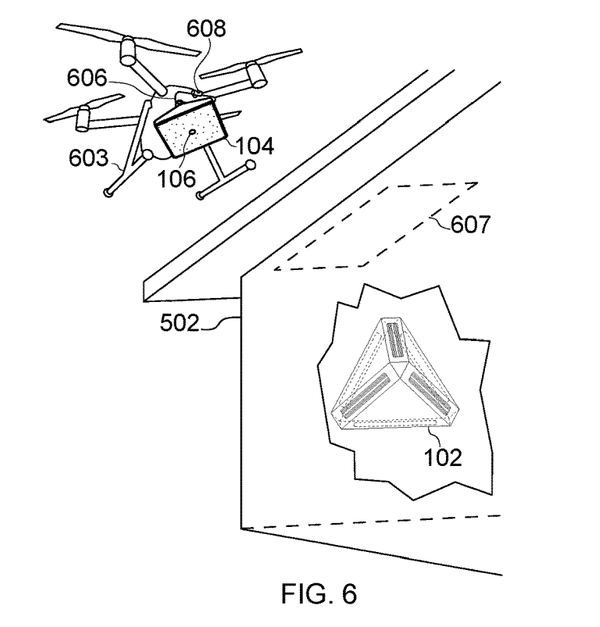
FIG. 6 is a view illustrating an embodiment implemented with a drone being used to check for leaks in a building.

FIG. 6 illustrates another embodiment where a signal generator 102 is placed inside a building 502 and a drone 603 is equipped with an acoustic camera 104 comprising also an optical camera 106 held by a vibration-absorbing payload mount 606. Ultrasound signals emitted from the signal generator 102 may be transmitted through a faulty roof window 607 and are received by the acoustic camera 104. The drone 603 may also be equipped with a first-person view (FPV) camera 608 and a system to wirelessly transmit information regarding the received ultrasound signals and the optical signal on a real time basis.

Figure 7:
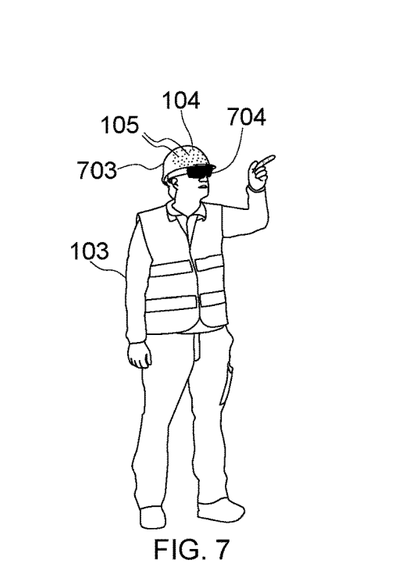
FIG. 7 illustrates an embodiment implemented with a hard hat and augmented reality glasses.

FIG. 7 illustrates another embodiment where the acoustic cameras 104 comprises microphones 105 placed at the surface of a hard hat 703, either integrated with the hard hat 703 or attached to the hard hat by a harness or other mechanism, and where acoustic images are displayed within augmented reality glasses 704 worn by the operator 103. This arrangement allows to overlay the acoustic images with the real world from the operator's point of view. In this embodiment, the acoustic camera does not need to comprise an optical camera. Such an arrangement may also include a system for recording or wirelessly transmitting the received transducer signals and/or optical signals from an (optional) optical camera.

In an embodiment, the emitted coded pulse signals may be audible or ultrasonic, ranging from about 20 kHz to about a few hundred kHz or even up to 800 kHz. While operation outside of this range may be possible, it would encounter challenges relating to absorption of the signal by air or attenuation such that detection would be difficult to achieve, even at short distances of less than a meter. The emitted coded pulse signals may cover a wide frequency range, for example by having a continuously non-zero spectrum between 20 kHz and 150 kHz. Alternatively, the emitted coded pulse signals could comprise a plurality of distinct frequencies, for example between 4 and 10 distinct frequencies between 20 kHz and 150 kHz.

In an embodiment, the signal generator may be operated to emit a plurality of different frequencies. In such an arrangement, the system may operate effectively even though some frequencies may interfere destructively or may be totally absorbed (by the enclosure, or due to the leak geometry).

The emitted coded pulse signals may consist of multiple band-limited signals at different frequencies, emitted in a pre-determined sequence, and the filter applied to the sound receiving transducer array may be designed to selectively enhance the corresponding received signals by implementing a band-pass filter that changes its center frequency over time, matched to the emitted coded pulse signals. Alternatively, a plurality of band-pass filters may be applied to the transducer signals concurrently, such that the detection is made only when the filtered signals show local maxima in the order corresponding to the coded pulse signal.

The signal generator may generate an ultrasound emission which is as omni-directional as possible so that every part of an enclosure is exposed to ultrasound and that all leaks in the enclosure can be found, especially in the case where the signal generator is placed near the center of an enclosure. When a signal generator is placed near a wall, the floor, or the ceiling of an enclosure, its directivity pattern may, for example, cover only a half-space.

Figure 9:
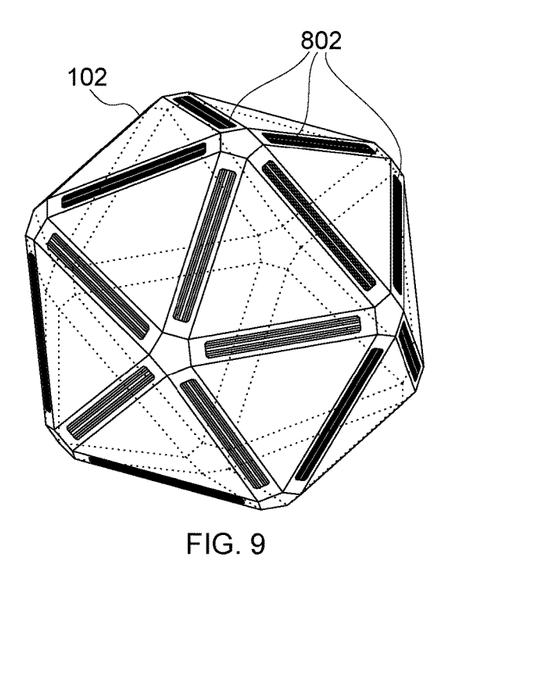
FIG. 9 illustrates an embodiment of a signal generator in the shape of a regular icosahedron with ribbon tweeters.
Figure 11:
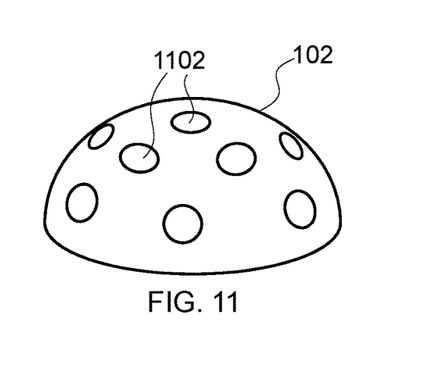
FIG. 11 illustrates an embodiment of a signal generator in the shape of a half-sphere.

Since it may be technically difficult to build an ultrasound emitter that is omni-directional or covering a half-space, the signal generator may comprise multiple emitters with overlapping emission patterns. FIG. 11 illustrates an a signal generator 102 according to an embodiment, comprising a plurality of loudspeakers 1102 arranged on a half-sphere, covering a half-space. Because ultrasonic loudspeakers often have a limited bandwidth (e.g. centered on 40 kHz), wide-band ribbon tweeters may be employed. Because ribbon tweeters are often rectangular in shape, the ribbon tweeters may be arranged on the edges of a regular polyhedron. For example, FIG. 9 illustrates an arrangement where the signal generator 102 is in the shape of a regular icosahedron and comprises a plurality of ribbon tweeters 802 disposed on the edges.

Figure 8:
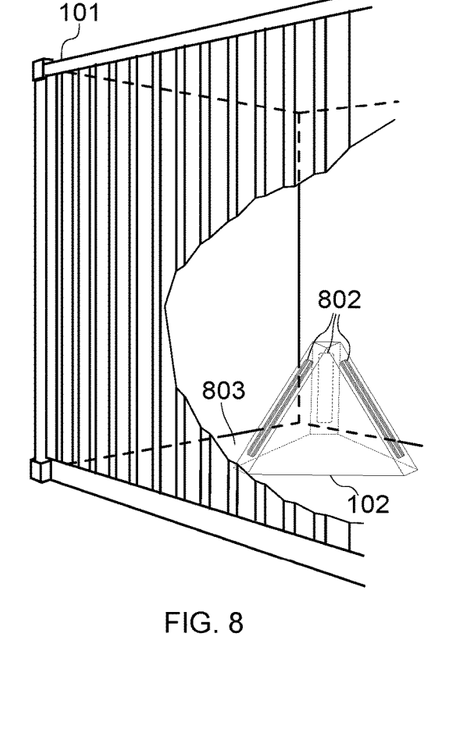
FIG. 8 illustrates an embodiment of a signal generator with ribbon tweeters.
Figure 10:
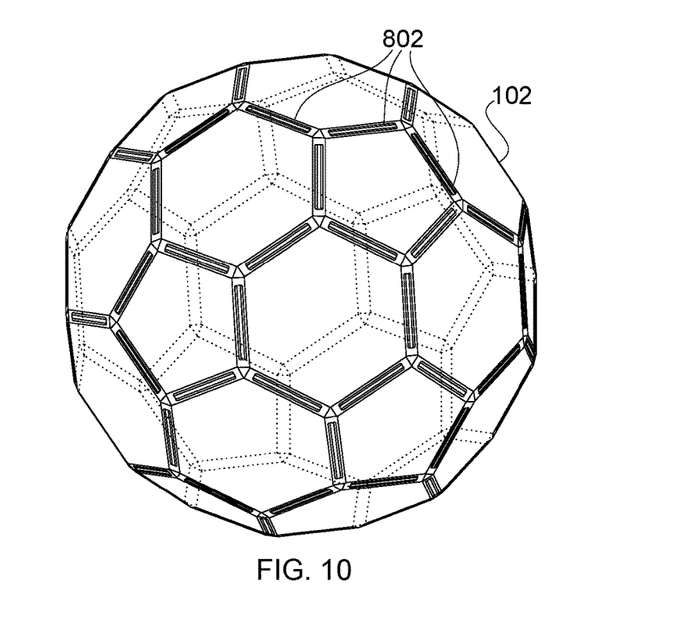
FIG. 10 illustrates an embodiment of a signal generator with ribbon tweeters arranged on a truncated icosahedron.

As an example of another embodiment, FIG. 8 illustrates a signal generator 102 with three ribbon tweeters 802 arranged in a three-faced pyramid shape. The signal generator 102 is placed on the floor 803 of an enclosure 101. Another embodiment is illustrated in FIG. 10 where a signal generator 102 includes a plurality of ribbon tweeters 802 arranged on the edges of a regular icosahedron. In another embodiment, FIG. 10 illustrates a signal generator 102 including a plurality of ribbon tweeters 802 arranged on the edges of a truncated icosahedron.

According to an embodiment, to avoid destructive interferences between the emitters, the individual emitters of the signal generator may emit uncorrelated signals (e.g. Kasami codes). For large enclosures or enclosures with complex shapes, multiple emitter devices can be used to cover the entire enclosure. In such an arrangement, the signals of the plurality of emitter devices may be operated so their signals are uncorrelated from each other.

The signal generator may be operated to produce continuous signals or coded pulse signals. Examples of continuous signals are sine waves, sums of sine waves, or white noise. Examples of coded pulse signals are sine wave bursts, linear or logarithmic chirps, Kasami codes, Gold codes (or any coded sequence with that have good cross-correlation values approaching the Welch lower bound). In an embodiment, the coded pulse signals can be shorter than the whole leak search campaign and may be repeated, such as every 0.5 seconds. The transmitter and receiver may be synchronized, for example, with a clock synchronization algorithm prior to the measurement such as NTP, IEEE 1588 (PTP), or using GPS. Such synchronization allows the system to determine the distance the sound has traveled and may help, in cases where the geometry of the enclosure is complex, to understand the leakage path of the sound, and therefore the path that a leaking fluid, e.g. rainwater, would take.

If the length of the path from the signal generator to the transducer array is known (e.g. by applying the aforementioned timing-based technique), the amplitudes of the cross-correlation between the coded pulse signal and the transducer signals will provide information about the size of the hole. This information can help an operator to prioritize the leak fixing process, e.g. the operator may decide to fix the biggest leaks first.

The following formula may be used to estimate the size A of the hole:

$$A = k*C/D$$

where C is the amplitude of the corresponding peak of the cross correlation between the coded pulse signal and a transducer signal, D is the distance from the transmitter to the receiver and A is the area of the hole in the enclosure. The factor k depends on the coded pulse signal, the acoustic gain of the signal generator, and the nature of the wall of the enclosure (e.g. sheet metal vs. double brick walls with insulation material between). If k cannot be determined precisely, this formula may be used to provide a biased estimate of A that can still be used to compare the relative sizes of different leaks in the same enclosure, under the condition that the wall material surrounding all the leaks is the same. The estimate of the leak size A can be further improved by classical signal processing techniques (i.e., using averaging, median filters, etc.). This estimate may be determined in real-time and presented on the display.

In an embodiment, an acoustic image (obtained, for example, by delay and sum beam forming) may be overlaid onto an optical image obtained by an optical camera, resulting in a composite image that can provide a visual indication of the location of a leak. The optical camera may be placed close to the center of the transducer array to avoid parallax problems. Such an arrangement, where a transducer array and an optical camera produces a composite image, may provide a precise visualization of the leakage areas. The acoustic and optical image processing and compositing may be performed in real-time by a portable receiver device so that operators in the field can find quickly the location of the leaks. The composite images may also be stored as an operator-independent visual proof of the location of leaks, e.g. for documentation purposes or for quality control purposes.

Figure 12:
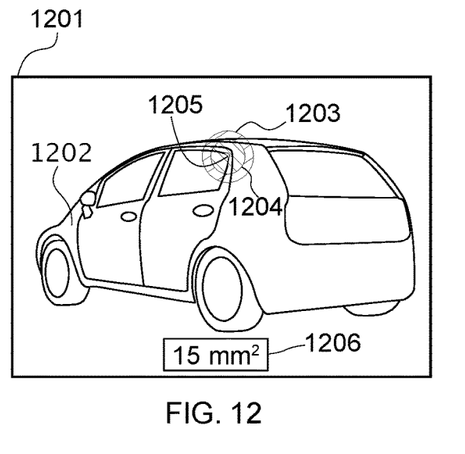
FIG. 12 illustrates an embodiment of display showing the location and size of a leak detected in a vehicle.

FIG. 12 illustrates a display 1201 from the system connected in FIG. 3, which shows a composite image comprised of an optical image 1202 of an enclosure captured by the optical camera, and an acoustic image computed from received transducer signals recorded while the optical image was taken. In this example, the composite image shows that the enclosure, in this case a vehicle, has a leak at one of its doors. Overlaid on the optical image is an acoustic image, which consists of a yellow zone 1203 and a red zone 1204 around the location of a leak 1205 on a door of the car. In an on-screen display 1206, an estimate of the leak area may also be displayed.

A signal generator disposed inside the vehicle emits an ultrasonic signal which, when there is a leak, emanates from the vehicle at the location of the leak and is captured by the receiving transducer array. An acoustic image is calculated, which has a maximum for the direction at which the leak is located relative to the transducer array. The intensity values of the acoustic image may be presented by a grayscale or may be converted into colors using a color map which maps very high intensity values to red, slightly lower values to yellow and very low values to a fully transparent color. The composite image obtained by overlaying the optical image with the acoustic image provides a useful visual indication where a leak occurs.

Figure 13:
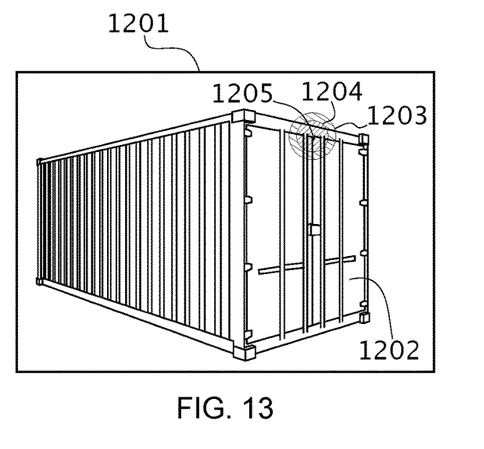
FIG. 13 illustrates an embodiment of a display showing the location of a leak detected in a shipping container.

In another example, FIG. 13 illustrates an image displayed on a display unit 1201 which may be a hand-held or portable display disposed with the receiving transducer array 104 and the optical camera 106 as illustrated in FIG. 1. The on-screen image 1201 shows an optical image 1202 of the enclosure 101, such as a shipping container, overlaid by an acoustic image, which consists of a yellow zone 1203 and a red zone 1204 around the location of a leak 1205 on the enclosure.

Figure 14:
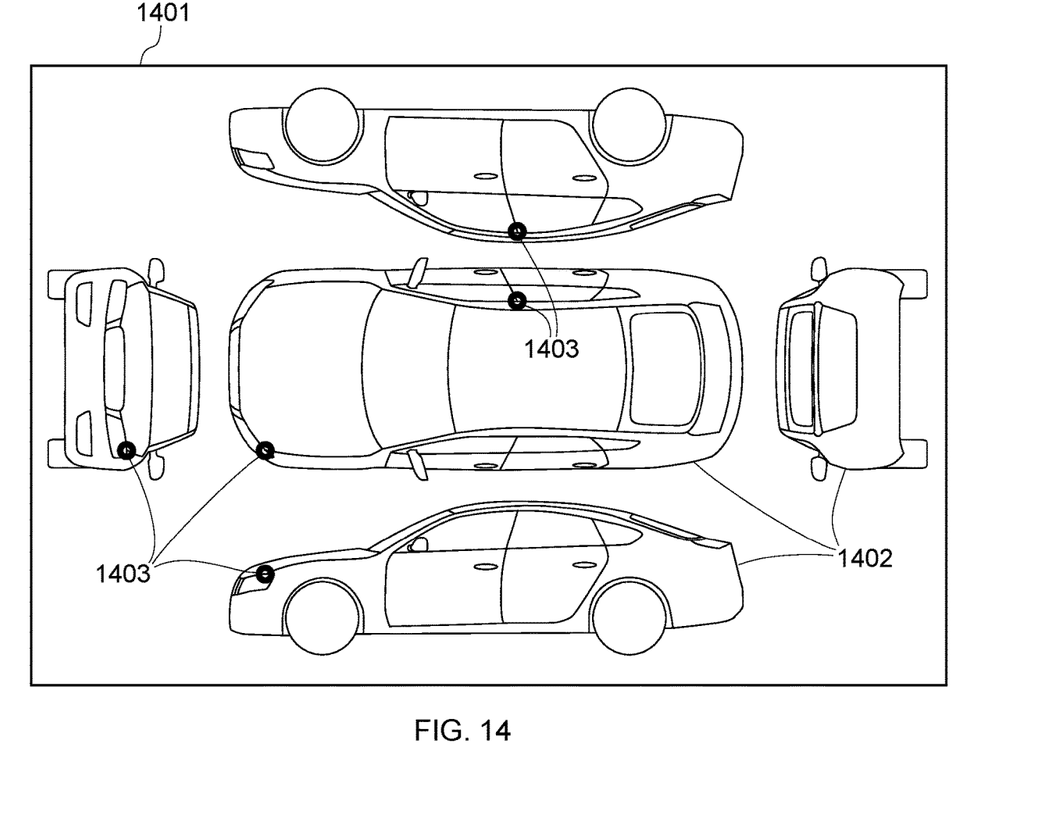
FIG. 14 illustrates an embodiment of a display showing several views of a vehicle and the location on the views of where a leak has been detected.

In another example, FIG. 14 illustrates an image displayed on a display unit connected to the system shown in FIG. 4. The on-screen image 1401 shows a plurality of synthetic optical images 1402 of the vehicle 303 reconstructed for different angles. Superimposed on the display of the synthetic optical images 1402 are markers 1403 around the locations where leaks have been detected.

Figure 15:
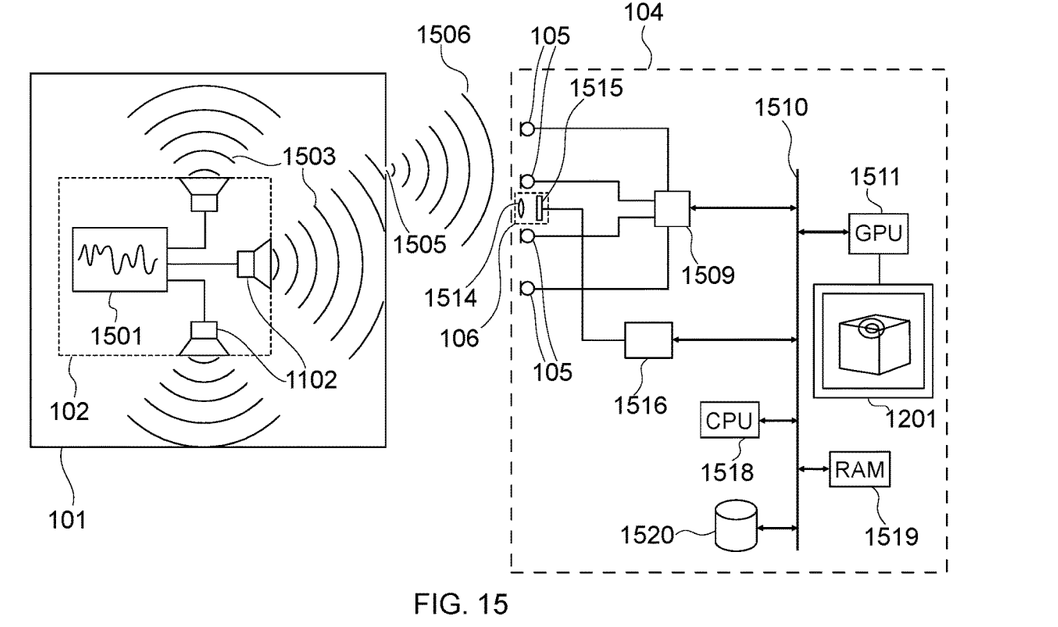
FIG. 15 is a schematic diagram of an embodiment of the system for detecting a leak.

FIG. 15 shows a schematic diagram of an embodiment of a tightness testing system with independent operation of the transmitting and receiving devices. The system includes a signal generator 102 having a signal generating electronic circuit 1501 and loudspeakers 1102 emitting sound waves 1503, which is placed inside an enclosure 101 with a leak 1505, from which sound waves 1506 can emanate and are picked up by the acoustic camera 104 having microphones 105 whose signals are processed by a signal processor 1509 in order to be converted into an acoustic image and to be sent to the graphics processing unit 1511 via the system bus 1510. Furthermore, the acoustic camera 104 may include an optical camera 106 having a lens 1514 and an image sensor 1515, which is connected via an image processing unit 1516 to the system bus 1510. The graphics processing unit 1511 overlays the optical image from the camera with the previously calculated acoustic image (typically with some degree of transparency), and displays the composite image on the display 1201. The system bus 1510 connects also a system processor 1518, a memory 1519, and storage 1520 to the other components.

Figure 16:
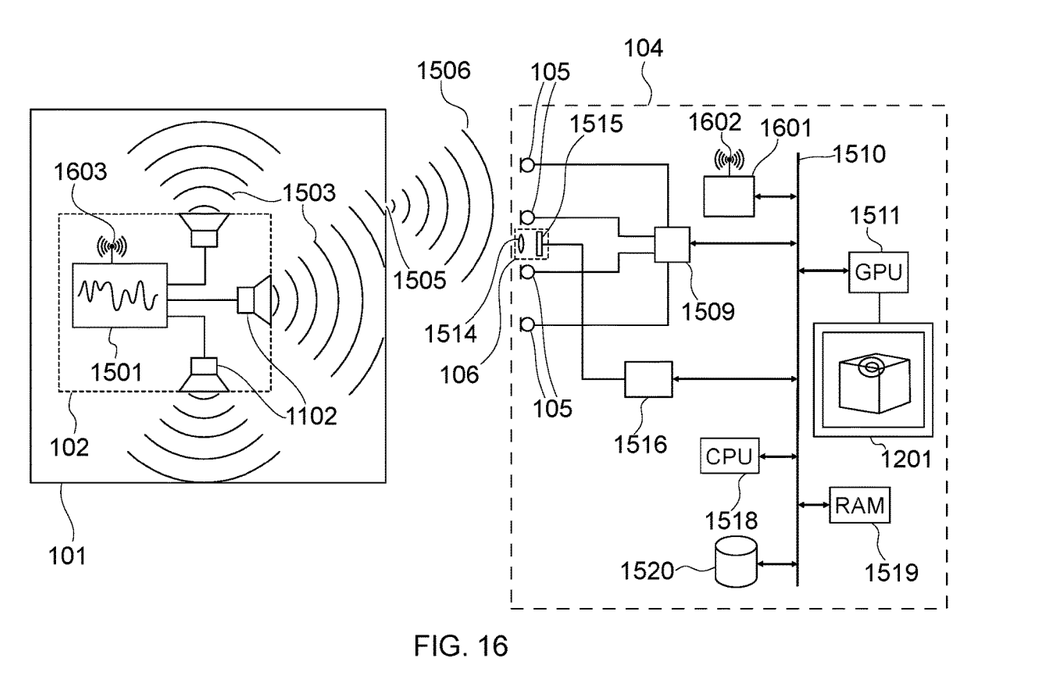
FIG. 16 is a schematic diagram of another embodiment of the system for detecting a leak.

FIG. 16 shows a schematic of another embodiment of a tightness testing system with radio remote control functionality. The system includes a signal generator 102 having a signal generating electronic circuit 1501, a radio antenna 1603 and loudspeakers 1102 emitting sound waves 1503, which is placed inside an enclosure 101 with a leak 1505, from which sound waves 1506 can emanate and are picked up by the acoustic camera 104 comprising a radio antenna 1602 connected to wireless module 1601, and microphones 105 whose signals are processed by a signal processor 1509 in order to be converted into an acoustic image and to be sent to the graphics processing unit 1511 via the system bus 1510. Furthermore, the acoustic camera 104 may include an optical camera 106 having a lens 1514 and an image sensor 1515, which is connected via an image processing unit 1516 to the system bus 1510. The graphics processing unit 1511 overlays the optical image from the camera with the previously calculated acoustic image (typically with some degree of transparency), and displays the composite image on the display 1201. The system bus 1510 connects also a system processor 1518, a memory 1519, and storage 1520 to the other components. The acoustic camera 104 can send a signal via its radio antenna 1602 to the signal generator 102, which receives this signal via its radio antenna 1603 and adjusts the output signal accordingly. In an embodiment of the invention, the signal generator 102 can transmit information via its radio antenna 1603 back to the receiving transducer array. In an embodiment of the invention, the signal processor 1509 of the acoustic camera 104 autonomously selects a suitable signal by analyzing the audio signals received from the microphones 105.

Figure 17:
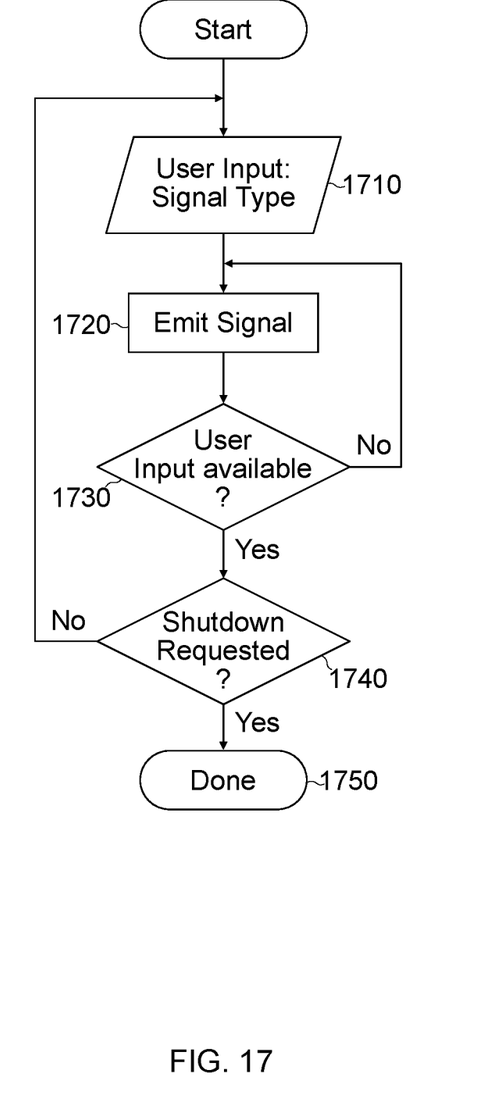
FIG. 17 is a flow diagram that illustrates operation of the emitter according to an embodiment.

FIG. 17 shows a flowchart of the operation of the signal generator 101 in the case of independent operation of the transmitting and receiving devices. In step 1710, upon startup of the signal generator, the user is prompted to select a signal type (e.g. sinusoid at 40 kHz frequency, different types of coded pulses, frequency hopping sequences, etc.), which, in step 1720, causes the signal generator to emit a signal of the selected type. At the end of each repetition of the signal, the signal generator checks, in step 1730, if any user input (e.g. a button press) is available. If not, the previously emitted signal is repeated until user input is available. If, in step 1730, any user input is available, the process continue to step 1740 which determines if the user input is identified as a shutdown request (e.g. a press on a "on/off" button). If, in step 1740, the user input was identified as a shutdown request, the process continues to step 1750 and the signal generator shuts down. Otherwise, the process returns from step 1740 to step 1710, where it will start again with the prompt to select a signal type.

Figure 18:
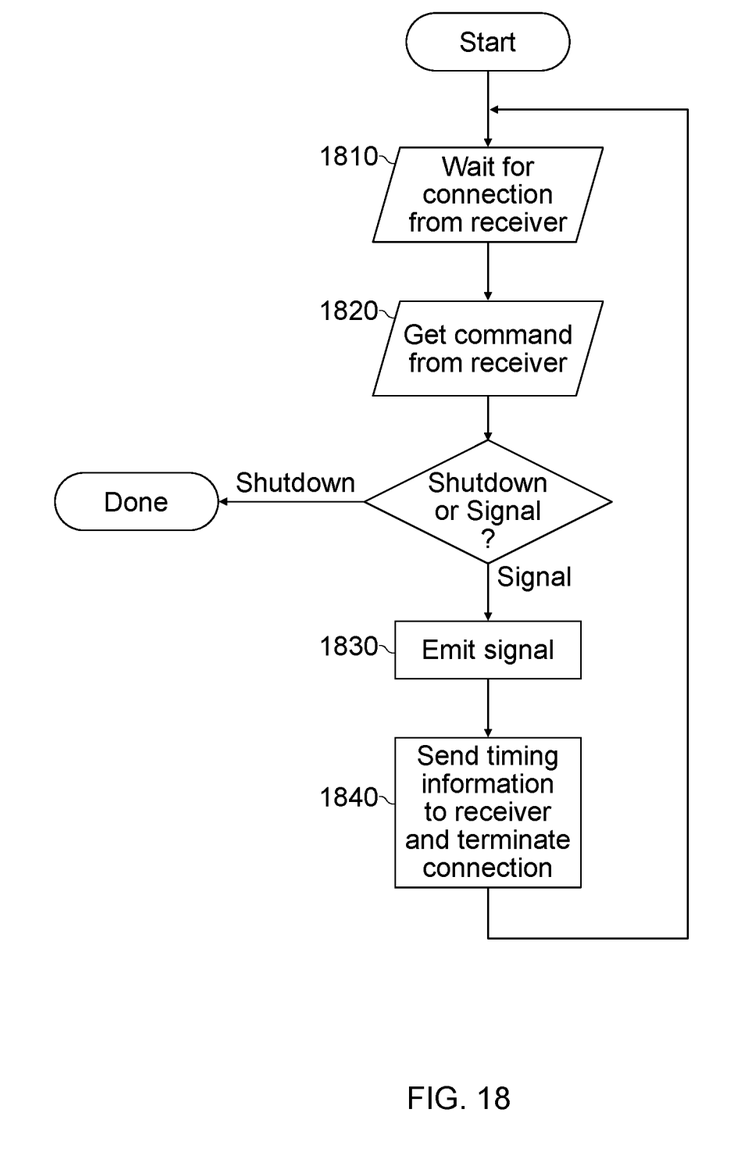
FIG. 18 is a flow diagram that illustrates operation of the emitter according to another embodiment.

FIG. 18 shows a flowchart of the operation of the signal generator 101 in the case where a receiver (e.g. the acoustic camera 104) wirelessly controls the signal generator. In step 1810, upon startup, the signal generator waits for a wireless connection from the receiver. When a connections has been established, the signal generator waits for a command in step 1820. If, in step 1820, the command was a shutdown command, the signal generator shuts down. Otherwise, in step 1820, if the command was a signal command (e.g. a command specifying a predefined signal type, or a command describing an arbitrary signal, possibly as a sequence of sample values), the process continues to step 1830 where the signal generator will emit this signal and send back timing information (e.g. when the signal ended) to the receiver and terminates the wireless connection in step 1840. Thereafter, the signal generator starts again in step 1810 with waiting for a wireless connection in step. In an alternative embodiment, the signal generator and the receiver may implement a protocol where the wireless connection is kept alive as long as messages are being exchanged (e.g. with a timeout after which the connection is terminated).

Figure 19:
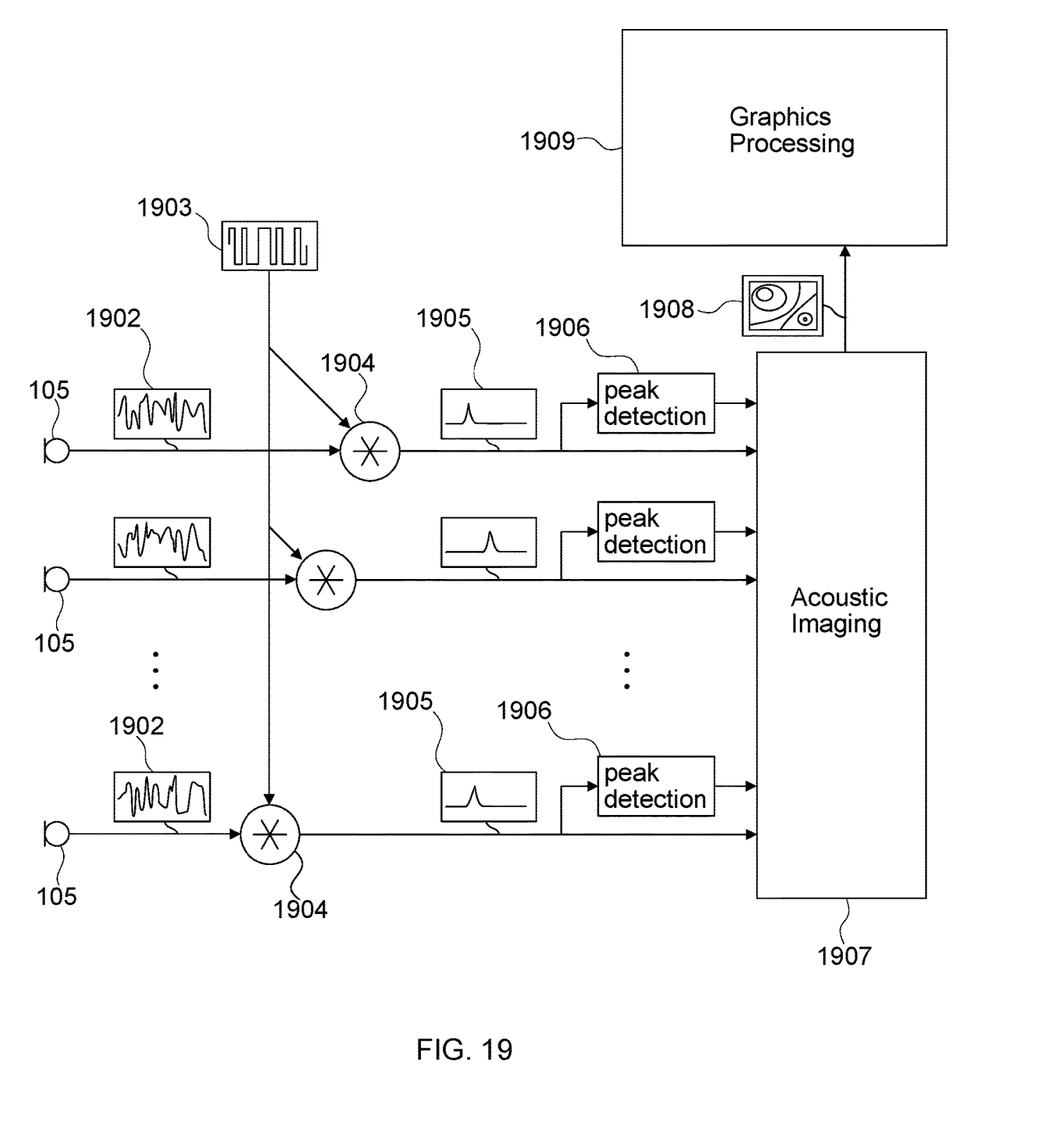
FIG. 19 is a schematic diagram that illustrates acoustic signal processing according to an embodiment.

FIG. 19 shows a schematic diagram of an embodiment of the acoustic signal processing in the receiving transducer array. The signals 1902 coming from the microphones 105 are convolved 1904 with the matched filter 1903. The resulting signals 1905 are supplied to an acoustic imaging processor 1907 (e.g. performing beamforming in multiple directions), and also into separate peak detectors 1906 whose output is used by an acoustic imaging processor in order to process only the signal around the peaks (improves signal-to-noise ratio). The acoustic imaging processor may send an acoustic image 1908 to a graphics processor 1909 which may overlay the acoustic image with an optical image.

The invention claimed is:

1. A system for testing an enclosure for leaks, the system comprising:
    at least one acoustic camera placed outside of the enclosure and comprising a plurality of electro-acoustic transducers arranged in a predetermined pattern, each of the electro-acoustic transducers converts received acoustic signals into electrical signals,
    an acoustic transmitter placed inside the enclosure comprising at least one transmitter generating acoustic signals,
    an electronic data processor programmed to receive and filter the electrical signals from the at least one acoustic camera and process filtered signals to produce an acoustic image representative of the acoustic signals received by the at least one acoustic camera that were generated by the acoustic transmitter and have traveled through a leak in the enclosure, and a display operatively coupled with the electronic data processor for displaying at least the acoustic image of the leak;

wherein the acoustic transmitter transmits signals according to a protocol, comprising a time modulation signal selected from the consisting of frequency hopping protocol, a coded pulse signal protocol, a multi-frequency signaling protocol, and a pure tone signaling protocol.

2. The system of claim 1 further comprising at least one optical camera that generates an optical image including at least a portion of the enclosure, the optical image is displayed together with the acoustic image on the display.

3. The system of claim 2 where the at least one acoustic camera, the at least one optical camera, and the display are integrated into a portable unit.

4. The system of claim 1 wherein the acoustic transmitter generates acoustic signals in a frequency range from 20 kHz to 800 kHz.

5. The system of claim 1 wherein a filter that matches the protocol implemented by the transmitter is applied to the signals received from the acoustic camera.

6. The system of claim 1 wherein at least the acoustic image of the leak is displayed in real-time.

7. The system of claim 1 wherein the filtered signals are analyzed to determine a size of the leak, and information regarding the size of the leak is displayed on the display.

8. The system of claim 7 wherein the filtered signals are analyzed to determine the size of the leak using an equation:

$$A = k * C / D$$

wherein A is the size of the leak, C is an amplitude of a corresponding peak of a cross correlation between a coded pulse signal from the coded pulse signal protocol and a transducer signal, D is a distance from the acoustic transmitter to the transducer, and k is a factor dependent on the coded pulse signal, an acoustic gain of the acoustic transmitter, and nature of the enclosure.

9. The system of claim 1 wherein the enclosure is conveyed past the electro-acoustic transducers which are disposed in a fixed arrangement.

10. An apparatus for determining a location of a leak in an enclosure, the apparatus comprising:

an array of ultrasonic transducers arranged in a predetermined pattern, each transducer converts received ultrasonic signals into electrical signals, the array of ultrasonic transducers disposed on one side of the enclosure, at least one optical camera disposed on the one side of the enclosure, the at least one optical camera being arranged to generate optical image signals of at least a portion of the enclosure, at least one ultrasonic transmitter that generates ultrasonic signals, the at least one ultrasonic transmitter being disposed on the other side of the enclosure, an electronic data processor arranged to receive the signals from the ultrasonic transducers and optical camera signals, the electronic data processor being programmed to process received signals to generate a composite image of the optical image and an image representative of an acoustic image based on ultrasonic signals received by the ultrasonic transducers from the at least one ultrasonic transmitter through a leak in the enclosure, and at least one display that is operatively coupled to the electronic data processor that displays at least the composite image;

wherein the at least one ultrasonic transmitter and the array of ultrasonic transducers are matched to transmit and receive signals according to at least one of a frequency hopping protocol, a coded signal protocol, a pulse coded signal protocol and a bandpass filtering protocol.

11. The apparatus of claim 10 wherein the electronic data processor is further programmed to determine a size of the leak, and information regarding the size of the leak is displayed on the at least one display.

12. The apparatus of claim 10 wherein at least the array of ultrasonic transducers and the optical camera are integrated together for combined movement about the enclosure.

13. The apparatus of claim 10 wherein the at least one ultrasonic transmitter comprises a plurality of ribbon tweeters disposed on edges of a regular polyhedron.

14. The apparatus of claim 10 where the enclosure is one of a vehicle, a freight container, and a building.

15. The apparatus of claim 10 further comprising a first wireless transceiver operatively coupled with the electronic data processor and a second wireless transceiver operatively coupled with the array of ultrasonic transducers, the first and second wireless transceiver wirelessly communicating information to match a signal protocol of the at least one ultrasonic transmitter to a signal protocol of the array of ultrasonic transducers.

16. The apparatus of claim 15 wherein the signal protocol is a synchronization protocol used to determine time-of-flight or distance parameters to estimate a size of the leak.

17. The apparatus of claim 10 wherein the at least one ultrasonic transmitter is comprised of a plurality of individual speakers generating independent ultrasonic signals.

18. A method for testing an enclosure for leaks comprising the steps of:

transmitting ultrasonic signals from within the enclosure using at least one ultrasonic transmitter disposed within the enclosure, receiving ultrasonic signals from the at least one ultrasonic transmitter emitted through a leak in the enclosure using an array of ultrasonic transducers disposed outside of the enclosure, the array of ultrasonic transducers receiving ultrasonic signals and converting the ultrasonic signals to electrical signals, processing the received ultrasonic signals to generate an ultrasonic image representative of the ultrasonic signals received through a leak in the enclosure, displaying the ultrasonic image on a display, analyzing the received ultrasonic signals to determine a size of the leak, and displaying information representative of the size of the leak;

wherein the at least one ultrasonic transmitter transmits signals according to a coding protocol and the signals received from the ultrasonic transducers are filtered based on the coding protocol.

19. The method of claim 18 further comprising the steps of:

generating a digital image of at least a portion of the enclosure using an optical digital camera disposed outside of the enclosure, generating a composite image comprising the ultrasonic image and the digital image, and displaying the composite image on the display.

20. The method of claim 18 wherein the array of ultrasonic transducers comprises a plurality of spaced apart ultrasonic transducers disposed at fixed locations outside of the enclosure, the method further comprising the step of:

conveying the enclosure past the plurality of spaced apart ultrasonic transducers.

21. The method of claim 18 further comprising the steps of:

receiving ultrasonic signals using the array of ultrasonic transducers from an environment outside of the enclosure where the array of ultrasonic transducers is disposed, applying a coding protocol to the ultrasonic signals transmitted by the at least one ultrasonic transmitter based upon the ultrasonic signals received from the environment outside of the enclosure, and applying a filtering protocol corresponding to the coding protocol to the signals received from the array of ultrasonic transducers.

22. A system for testing an enclosure for leaks, the system comprising:

at least one acoustic camera placed outside of the enclosure and comprising a plurality of electro-acoustic transducers arranged in a predetermined pattern, each of the electro-acoustic transducers converts received acoustic signals into electrical signals, an acoustic transmitter placed inside the enclosure comprising at least one transmitter generating acoustic signals, an electronic data processor programmed to receive and filter the electrical signals from the at least one acoustic camera and process filtered signals to produce an acoustic image representative of the acoustic signals received by the at least one acoustic camera that were generated by the acoustic transmitter and have traveled through a leak in the enclosure, wherein the acoustic transmitter transmits signals according to a protocol, wherein the protocol is a synchronization protocol used to determine a time-of-flight.

23. A system for testing an enclosure for leaks, the system comprising:

at least one acoustic camera placed outside of the enclosure and comprising a plurality of electro-acoustic transducers arranged in a predetermined pattern, each of the electro-acoustic transducers converts received acoustic signals into electrical signals, an acoustic transmitter placed inside the enclosure comprising at least one transmitter generating acoustic signals, an electronic data processor programmed to receive and filter the electrical signals from the at least one acoustic camera and process filtered signals to produce an acoustic image representative of the acoustic signals received by the at least one acoustic camera that were generated by the acoustic transmitter and have traveled through a leak in the enclosure, wherein the acoustic transmitter transmits signals according to a protocol, wherein the protocol is a synchronization protocol used to determine distance parameters.

* * * * *